(12) United States Patent
Cherukuri et al.

(10) Patent No.: US 8,782,145 B2
(45) Date of Patent: Jul. 15, 2014

(54) FOLLOWING CONTENT ITEM UPDATES VIA CHAT GROUPS

(75) Inventors: Ravikant Cherukuri, Snoqualmie, WA (US); Aditya Bandi, Redmond, WA (US); Cheuk Wan William Lau, Bellevue, WA (US); George Joy, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 921 days.

(21) Appl. No.: 12/695,403

(22) Filed: Jan. 28, 2010

(65) Prior Publication Data
US 2011/0185025 A1 Jul. 28, 2011

(51) Int. Cl.
*G06F 15/16* (2006.01)

(52) U.S. Cl.
USPC .............................. 709/206; 709/204; 709/205

(58) Field of Classification Search
None
See application file for complete search history.

(56) References Cited

U.S. PATENT DOCUMENTS

| | | | | |
|---|---|---|---|---|
| 6,393,460 | B1 * | 5/2002 | Gruen et al. | 709/204 |
| 7,120,672 | B1 * | 10/2006 | Szeto et al. | 709/206 |
| 7,590,699 | B2 | 9/2009 | Natarajan et al. | |
| 2005/0102358 | A1 * | 5/2005 | Gold et al. | 709/204 |
| 2008/0091550 | A1 | 4/2008 | Zacarias et al. | |
| 2008/0126990 | A1 * | 5/2008 | Kumar et al. | 715/835 |
| 2008/0274739 | A1 * | 11/2008 | Wu | 455/435.1 |

OTHER PUBLICATIONS

Poland, Steve, "IM Bots: (Almost) Real-Time Blog Chat via IM", Retrieved at <<http://blog.stevepoland.com/im-bots-almost-real-time-blog-chat-via-im/>>, Mar. 22, 2007, pp. 7.
Bryant, Martin, "How to Publish and Receive Blog Posts in Real-Time", Retrieved at <<http://thenextweb.com/2009/09/08/publish-recieve-r-realtime/>>, Sep. 8, 2009, pp. 8.
Ditesco, "Digsby: Real Time Web, IM, Email, Social Networks", Retrieved at <<http://twittnotes.com/2009/08/digsby-real-time-web-im-email-social.html>>, Aug. 2009, pp. 3.
Chatterous, "Chatterous Blog", Retrieved at <<http://chatterous.wordpress.com/>>, Apr. 2, 2009, pp. 6.
"PBworks Unveils Real-Time and Voice Collaboration Offerings", Retrieved at <<http://www.cbronline.com/news/pbworks_unveils_realtime_and_voice_collaboration_offerings_091102>>, Nov. 2, 2009, pp. 2.

* cited by examiner

*Primary Examiner* — Umar Cheema
(74) *Attorney, Agent, or Firm* — Bryan Webster; Andrew Sanders; Micky Minhas

(57) ABSTRACT

A content item hosted by a content item source (such as a weblog post of a weblog) may receive updates (e.g., comments submitted by users), and may be discussed among users in a chat group of a chat service. The content item source and the chat service may coordinate to notify users of updates to the content item, and to share content regarding the content item. When a user requests to subscribe to updates of the content item, the content item source may invite the user to join a chat group of the chat service created for discussion of the content item. Additionally, updates to the content item received by the content item source may be automatically posted as messages in the chat group, and messages posted in the chat group regarding the content item may be automatically posted as updates to the content item at the content item source.

20 Claims, 8 Drawing Sheets

FOLLOWING CONTENT ITEM UPDATES VIA CHAT GROUPS

BACKGROUND

In the field of computing, many scenarios may involve a content item, such as a news article, a factual description such as an encyclopedia, or a weblog post, which may involve one or more user updates, such as additions or changes of information or comments comprising a discussion of the content item. Such content items are often posted by a content item source, such as a webserver hosting a website comprising a set of content items, which may accept updates from users and associate them with the news article. In some scenarios, the user updates may be posted in a series that is organized in various ways (e.g., sequentially, by priority, or according to threads); in other scenarios, the user updates may comprise alterations of the body of the content item (e.g., an editable wiki page regarding a particular topic.)

A user who is interested in the topic of a content item may wish to follow the updates posted to the content item. In many such scenarios, the user may simply issue a series of requests to the content item source for the content item (such as a web page of a website), and may examine the content item for new material. In other scenarios, the user may be able to query the content item source for a list of updates, e.g., a real simple syndication (RSS) feed that presents a series of updates to the content item. In still other scenarios, the user may be able to request the content item source to notify the user upon receiving updates to a particular content item (such as a post in a web forum regarding a particular topic, for which the web forum software may be configured to send an email message to the user upon receiving an additional post in the topic.) However, some content item sources may not be configured to permit users to subscribe to updates, and users may have to visit and revisit many content item sources in order to remain informed about updates to particular content items of interest.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In many contemporary scenarios involving a user who wishes to follow a set of updates to a content item, the user may have to query the content item source repeatedly for updates. This repeated querying may be inefficient in many respects. For example, a first query may result in few or no updates (since a previous query), thereby resulting in an inefficiency in the user's time and the rendering resources of the content item source, while many other updates regarding the same topic may be posted elsewhere but may be unread by a user who is not aware of this activity. Periodically polling a data feed (such as an RSS feed) of the content item source may be similarly inefficient if few or no updates are received. An email notification mechanism may alleviate this polling to a limited extent, but email may be too slow or cumbersome to keep the user apprised of updates on a prompt basis. Therefore, the efficiency of the user in monitoring a content item source for updates to a content item may yield comparatively few results, while expending significant amounts of the user's time and the resources of the content item sources.

It may be appreciated that some of these inefficiencies derive from the unsuitability of many content item sources (such as web pages and wiki pages) to handle the scenario of a near-realtime updating (particularly with "push"-type notifications) of a content item, particularly where the updates involve an ad hoc and informal conversation among a (potentially large and possibly anonymized) series of users. By contrast, many chat services offer various group chat scenarios that may be readily suitable for notifying a user of a set of updates in near-realtime, and in particular for hosting an ad hoc group of users in a conversation about a topic. However, in many scenarios, the discussion arising in a chat service is ephemeral, and unless captured and preserved by a user, the discussion often disappears without having a lasting effect on the content item.

Techniques may be developed to merge the ad hoc, conversation-provoking environment of a chat group with the nontransient nature of a content item source (such as a web page or wiki page.) When a user expresses interest in a content item hosted by a content item source, the user may be invited to join a chat group hosted by the chat service regarding the content item. If the user accepts this invitation, a chat group interface may connect the user with other users who wish to follow the content item. Moreover, the chat group and the content item source may coordinate, such that updates to the content item (including additions or alterations of the content item, follow-up information, and comments submitted by various users regarding the content item) may be automatically posted as messages in the chat group, and messages posted to the chat group regarding the content item may be automatically posted by the content item source as updates to the content item. In this manner, the user may follow updates about the content item through an interface that is well-suited for near-realtime updates and discussion, while also preserving some of the automated non-transience of a web page, wiki page, or web forum. In some embodiments, the user may be able to follow updates to many content items through a single chat interface, and/or to maintain subscriptions for a non-ephemeral period in order to receive notification of updates submitted over a long period of time. This coordination may also improve the efficient use of resources by the content item source (e.g., by reducing redundant refreshing of the content item by visitors) and/or may promote additional use of the chat group.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
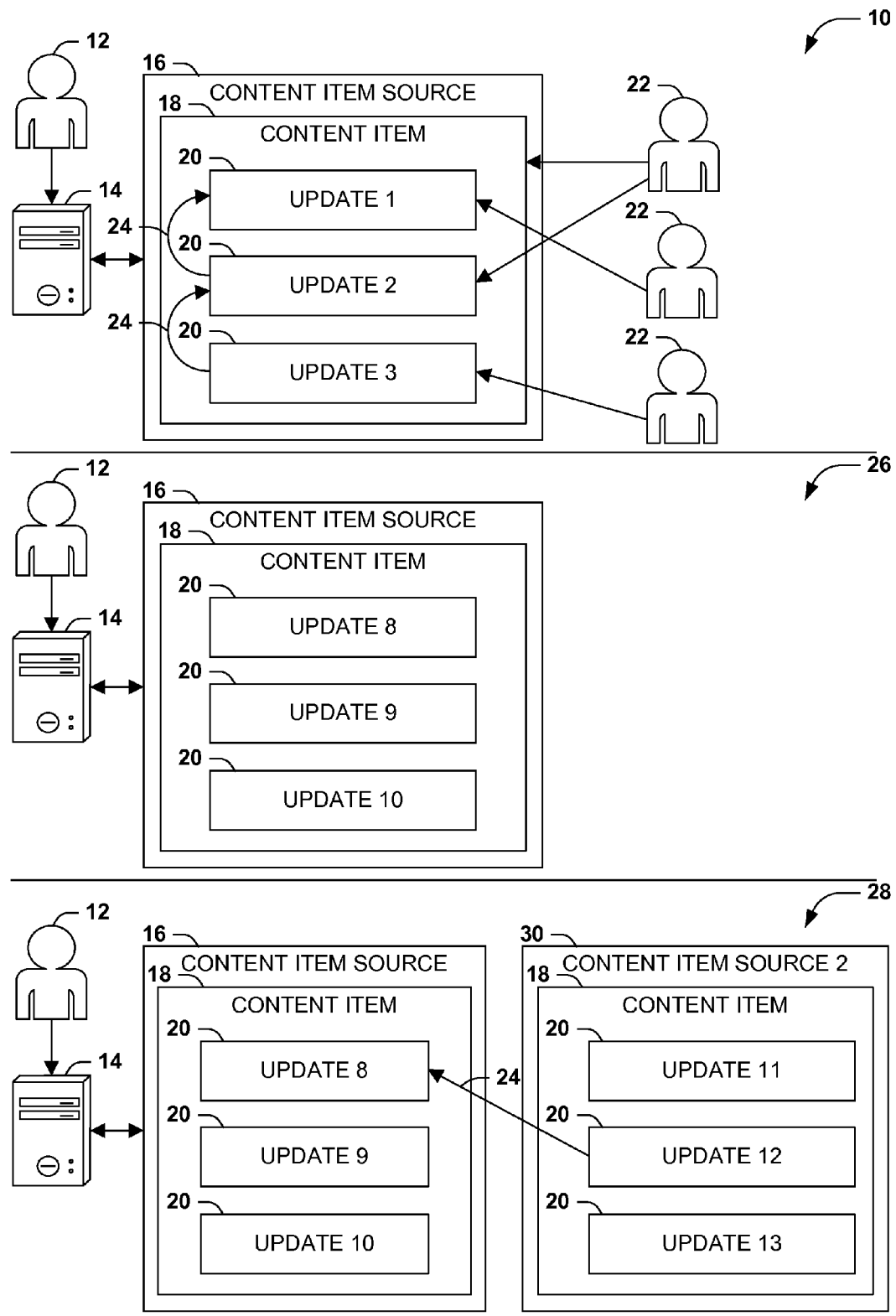
FIG. 1 is an illustration of an exemplary scenario featuring a user monitoring updates to a content item hosted by a content item source.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve a content item hosted by a content item source, such as a news article hosted on a web page of a webserver, an informational summary hosted on a wiki page of an information source, a commentary posted on a weblog, and a topical post on a web forum. In these scenarios, the content item may often receive a series of updates, including supplemental information provided by the author of the content item or other users, alterations to the content item (particularly for content items represented as a wiki-based informational page), and/or comments by various users that comprise a conversation regarding the content item.

The content item source may present the content item and the updates to the user in various ways. As a first example, the content item source may present the content item, and may then present a list of updates to the content item, which may be sorted in various ways (e.g., sequentially, by priority, or in a threaded manner, such as a nested hierarchy of nodes representing updates that contain as subnodes any responsive updates, thereby presenting the discussion as a hierarchy of conversational threads.) As a third example (particularly with wiki informational pages), the content item source may present to the user the latest version of the content item, but the user may be able to review the series of updates and various previous versions of the content item.

FIG. 1 presents an exemplary scenario featuring a user 12 of a device 14 (such as a workstation computer) who is interested in a content item 18 hosted by a content item source 16, and who wishes to receive updates 20 to the content item 18. At a first time point 10, the user 12 may query the content item source 16 for a rendering of the content item 18 and the updates 20, and the content item source 16 may present to the user 12 a representation thereof, e.g., a web page comprising the content item 18 and a chronologically ordered column of updates 20 submitted by various submitters 22. For example, a first submitter 22 may have authored the content item 20; a second submitter 22 may submit a first update representing a comment on the content item 18; the first submitter 22 may submit a second update 20 in response to the first update 20 (represented as a responsive relationship 24 of the second update 20 with the first update 20); and a third submitter 22 may submit a third update 20 having responsive relationship 24 with the second update 20. In this manner, the user 12 may follow the chronology and interaction of the updates 20 to the content item 18, and may remain informed thereof. The user 12 may also wish to submit updates 20 to the content item 18, e.g., by commenting on the content item 18 or on previously received updates 20.

However, some inefficiencies may exist within this scenario. As a first exemplary inefficiency, the user 12 is often not informed when updates 20 to the content item 18 are received by the content item source 16, and may therefore have difficulty following the content item 18. Instead, the user 12 may have to query the content item source 16 for updates 20 on an arbitrary basis, e.g., based on the whims or availability of the user 12. For example, at a second time point 26, the user 12 may query the content item source 16 for updates 20 to the content item 18, only to receive a large number of updates 20 that have been received since the first time point 10. The user 12 may have desired to have been informed that many updates 20 were arriving frequently, but because the user 12 was unaware of this occurrence, the user 12 may, at the second time point 26, have to catch up with the (potentially large) set of new updates 20. Conversely, at a third time point 28, the user 12 may repeatedly query the content item source 16 for updates 20, but if no new updates 20 have been received, then each query yields little or no value to the user 12 (while also consuming the resources of the content item source 16 in repeatedly rendering the content item 18 and the set of updates 20 in response to each query of the user 12.) Meanwhile, a second content item source 20 may be receiving other updates 20 relating to the same content item 18 (e.g., informational updates or comments posted on another website about the same topic), yet the user 12 may be unaware of the second content item source 30 or the updates 20 to the content item 18 posted thereto, and may therefore miss many updates 20 that might be of significant interest to the user 12. Moreover, the user 12 may simply be unable to query a potentially large set of content item sources 16 frequently for updates 20 to a potentially large set of content items 18; therefore, the user 12 may have to delay or forgo the querying of some content item sources 16, and may miss potentially interesting updates 20 posted thereto.

Some techniques may be available to mitigate these inefficiencies. As a first example, a content item source 16 (such as a website or web forum) may offer to notify the user 12 when one or more new updates 20 to the content item 18 are received. However, this notification is often presented as an email notification, whereby the content item source 16 sends an email message to an email account of the user 12 to notify the user 12 that new updates 20 to a particular content item 18 have been received. However, email notifications may be inefficiently slow or cumbersome, because email is not well-designed for near-realtime notifications. The user 12 may also have to toggle between an email client (where the notifications of updates 20 are received) and an interface to the content item source 16 (such as a website presented in a web browser), thereby adding to the inefficiency of the user experience in following updates 20 to the content item 18. Moreover, it may be difficult for the user 12 to contribute an update 20 to the content item 18 through the email client.

As a second example, a content item source 16 may offer a data feed, such as a real simple syndication (RSS) feed that presents to the user as a queryable list of updates 20 to a particular content item 18. The user 12 may execute on the device 14 an RSS reader that periodically polls the content item source 16 for updates 20 to a content item 18 represented in the data feed, and may notify the user 12 upon detecting such updates 20. However, this scenario also utilizes an inefficient polling mechanism; e.g., if the user 12 periodically queries a data feed that is not often updated, such queries represent an inefficiency and a valueless consumption of computing resources of the content item source 16 in repeatedly providing to the user 12 an unchanging data feed. This inefficiency may be reduced by increasing the polling period, but at the cost of an added delay to the user 12 in receiving notification of an update 20. Again, it may be difficult and/or expensive for the device 14 of the user 12 to poll a potentially large set of data feeds offered by various content item sources 16, or to follow the large set of updates 20 received therefrom.

More generally, webservers are often inefficient hosts of an interaction offering near-realtime updates. This is because the hypertext transport protocol (HTTP) is oriented around a request/response model, where the client's request for a resource is quickly satisfied and the connection is closed to free server resources to handle other requests. This connection model is difficult to convert for use in a scenario featuring push-type notification of updates to many users in near-realtime. As a result, webservers are generally not well-suited for maintaining a comparatively large number of long-lived connections, such as connections to a potentially large number of clients in a chat group. While some techniques may ameliorate this difficulty (e.g., push techniques embodied in the HTTP5 standard), it may be appreciated that the field of webserver-based chat is not presently well-developed. For example, it is unclear how a large chat session among a potentially large body of users may be hosted on a distributed set of interoperating webservers.

By contrast, other types of servers, based on other protocols, may be very well-suited for hosting chat sessions. For example, the Internet Relay Chat (IRC) protocol was designed in 1988 primarily for configuring a server to maintain open connections, and much development has occurred in configuring IRC servers to support thousands of concurrent users in a distributed, multi-server fashion. Many types of instant messaging (IM) protocols have also been developed to promote near-realtime, conversational communication among ad hoc groups of users. For scenarios involving a stream of near-realtime updates 20 of a content item 18, which may include conversational dialogue among users 12 regarding the content item 18, a chat server implementing a chat service using one of these protocols may be more efficient than a webserver. Therefore, the communication protocol of a chat server may be more efficient for connecting a large set of users 12 in a persistent manner and distributing updates 20 in near-realtime.

However, a group chat environment may not be fully sufficient for hosting the updates 20 to a content item 18. As a first example, a group chat environment may be somewhat less organized than similar information presented in other formats; e.g., it may be easier to identify significant comments in a web forum or weblog comments section than to follow the observations presented in a transcript of an online chat. This difference might result from the different types of conversation prompted by each communication environment. For example, a weblog comments section, wiki page, or web forum may encourage coherent and formal messages comprising discrete units, wherein a first user 12 may fully express his views in a single (and potentially lengthy) post, and to which a second user 12 may subsequently reply in full in a responsive (perhaps also lengthy) article. By contrast, a chat group often prompts a colloquial, free-flowing conversation with many concurrent speakers, where ideas are expressed conversationally in small segments of thoughts and statements, and where users 12 frequently interrupt each other, or discuss a topic in a rapidly interleaved manner without a turn-taking etiquette protocol. As a second example, messages submitted in a chat group are often formulated, intended, and anticipated to be ephemeral, and only part of a transient discussion, while a submission of a wiki entry, weblog comment, or other update posted on a website often feels more significant and lasting, as if submitted as part of a formal record. Accordingly, a chat group may be a useful setting for developing and discussing ideas, and may be technologically easier to organize and host (particularly among a potentially large set of users 12 in a comparatively long-term discussion), but may not be an efficient format for storing a significant set of updates 20, such as may be presented on a website.

Due to these and other aspects, these communication environments are often offered and maintained separately, with little crossover except some semantic references from one environment to the other. In regard to a particular topic, users 12 may choose to visit a content item source 16 (such as a news page, a web forum, or a wiki page) to view and contribute significant updates 20 to a content item 18, or may choose to join a chat group in order to follow or engage in an informal, unstructured, and transient conversation with other users 12 regarding the content item 18. However, the conversation in the chat group rarely affects the content item 18 offered by the content item source 16, and content items 18 from the content item source 16 are rarely specified in full (particularly if lengthy) in a chat group. In fact, when users 12 of a chat group wish to discuss a particular content item 18, a user 12 often posts to the chat group a hyperlink to the full content of the content item 18 at the content item source 16, which other users 12 may visit to examine the full content item 18 before returning to the chat group to discuss the content item 18 in the conversational, interleaved setting of the chat group. Thus, users 12 may switch between these two communication environments in order to satisfy different interests regarding the content item 18 (e.g., using the content item source 16 to provide and receive information in the form of comparatively lengthy comments and sets of information, and using the chat group to discuss the content item in short, conversational messages.)

Figure 2:
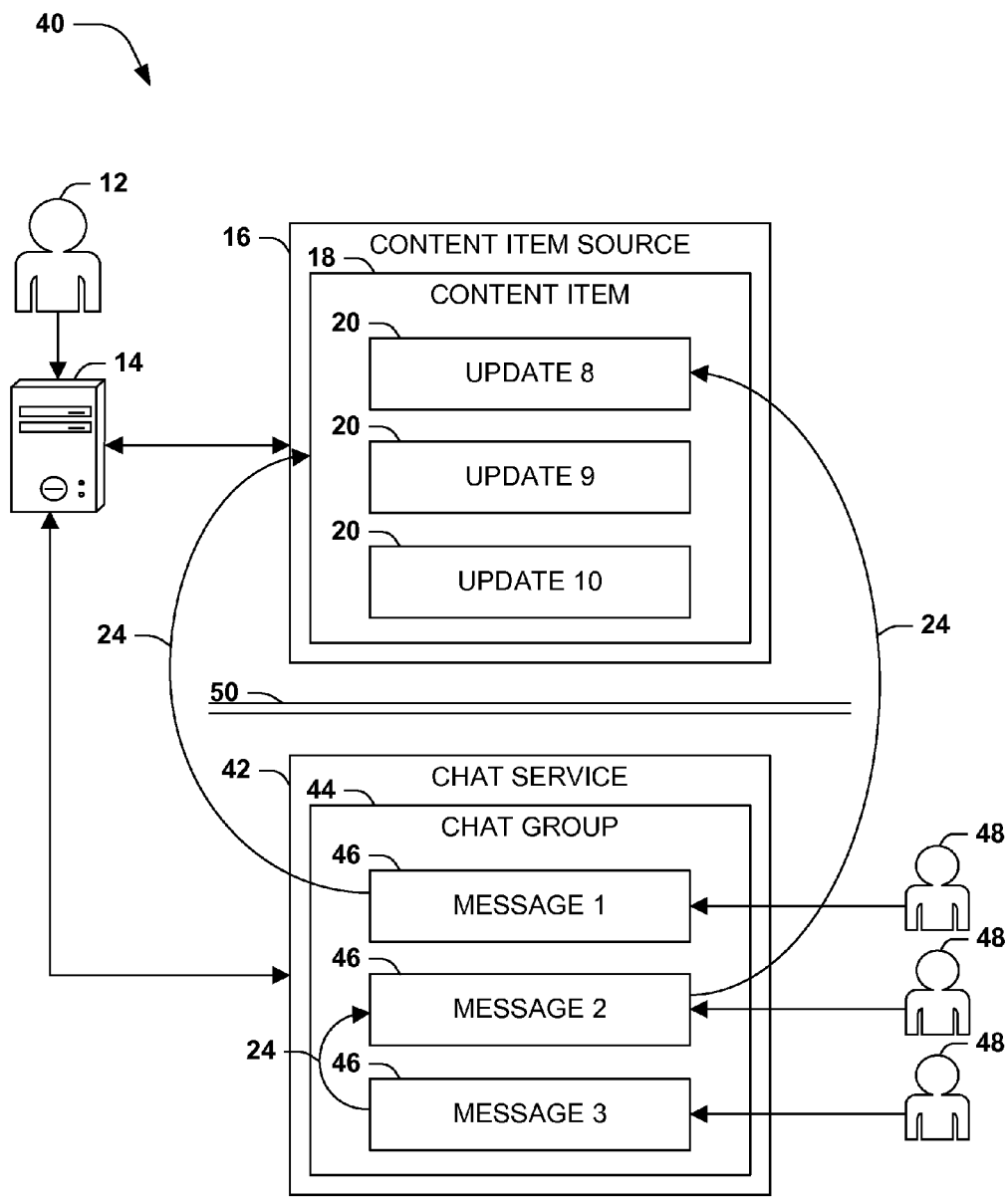
FIG. 2 is an illustration of an exemplary scenario featuring a user monitoring updates to a content item hosted by a content item source and participating in a discussion of the content item within a chat group hosted by a chat service.

FIG. 2 presents an exemplary scenario 40 featuring a user 12 of a device 14 who engages in discussion of a content item 18 hosted by a content item source 16. The content item source 16 may host a set of updates 20 to the content item 18, such as responsive comments, anecdotes, supplemental information, and alterations to the content item 18. The user 12 may participate in the development of the content item 18 by submitting an update 20, such as a comment, which the content item source 16 may incorporate in the set of updates 20 of the content item 18. Additionally, the user 12 may utilize a chat service 42 to access a chat group 46, where various chat participants 48 may exchange messages 46 that comprise a conversation about the content item 18. The chat participants 48 (including the user 12) may refer to the content item 18 and one or more updates 20 in a message 46, thereby creating a responsive relationship 24 of a message 46 with the content item 18 or an update 20 thereof, as well as with preceding messages 46 posted by the chat participants 48. However, the content item source 16 and the chat service 42 often do not interoperate to share content regarding the content item 18. As such, a partition 50 often exists between the set of updates 20 to the content item 18 at the content item source 16 and the set of messages 46 discussing the content item 18 in the chat group 44, and the only significant overlap may comprise loose references by the participants in one of these environments to the content of the other environment, and an occasional sharing of content (e.g., an author of an update 20 to the content item 18 may quote an excerpt of messages in the chat group 44, and a chat participant 48 may copy and paste a portion of the content item 18 or the update 20 in a message 46 submitted to the chat service 44.)

Techniques may be achieved for reducing this partition 50 of content between the set of updates 20 to the content item 18 hosted by the content item source 16 and the set of messages 46 comprising a conversation about the content item 18 posted in the chat group 44 of the chat service 42. In particular, the chat server 42 may be configured to deliver updates 20 to the content item 18 to the chat service 42 for posting as messages 46 in the chat group 44; and the chat group 44 may deliver messages 46 posted in the chat group 44 to the content item source 16 for inclusion in the set of updates 20 to the content item 18. This interaction may present several advantages. As a first example, users 12 may follow the updates 20 to a content item 18 in a near-realtime manner by joining the chat group 44 and monitoring the updates 20 posted therein. Because the infrastructure of the chat service 42 may provide greater support for near-realtime updates pushed to a potentially large and ad hoc set of users 12 than the infrastructure of the content item host 16 (such as a webserver), this technique for publishing the updates 20 to the users 12 may not only transmit the updates 20 to the users 12 in a quicker manner, but may also economize the resources of the content item source 16 (e.g., by reducing polling of the content item 18 by users 12 eager to receive updates 20 thereto.) As a second example, the updates 20 to the content item 18 may be automatically injected into the conversation occurring in the chat group 46, so users 12 may not have to keep checking the content item source 16 outside of the interface of the chat group 44 (e.g., by toggling to a web browser or RSS reader to query the content item source 16 for updates 20 to the content item 18, and then toggling back to the interface of the chat group 44 to refer to, publish excerpts of, or discuss such updates 20 with other chat participants 48.) As a third example, significant aspects of the conversation arising in the chat group 44 may be automatically posted as updates 20 to the content item 18 at the content item source 16, so that users 12 may not have to prepare excerpts or transcripts of the conversation for republication as updates 20 to the content item 18 at the content item source. As a fourth example, some embodiments may allow a user 12 to receive updates 20 to several content items 18 through a single interface, and/or to participate in conversations about many content items 18 in a single interface. Moreover, some embodiments may allow the user 12 to maintain subscriptions to one or more content items 18 for a comparatively duration, and to receive notifications of updates 20 to the content item 18 that are received over a comparatively long period of time, thereby reducing the ephemeral nature of user interest in a content item 18 (which often arises from the difficulty of frequently checking the content item 18 for updates 20 over a long duration.) These and other advantages may be achieved by the cooperative interaction and content-sharing arrangement of the content item source 16 and the chat service 42.

Figure 3:
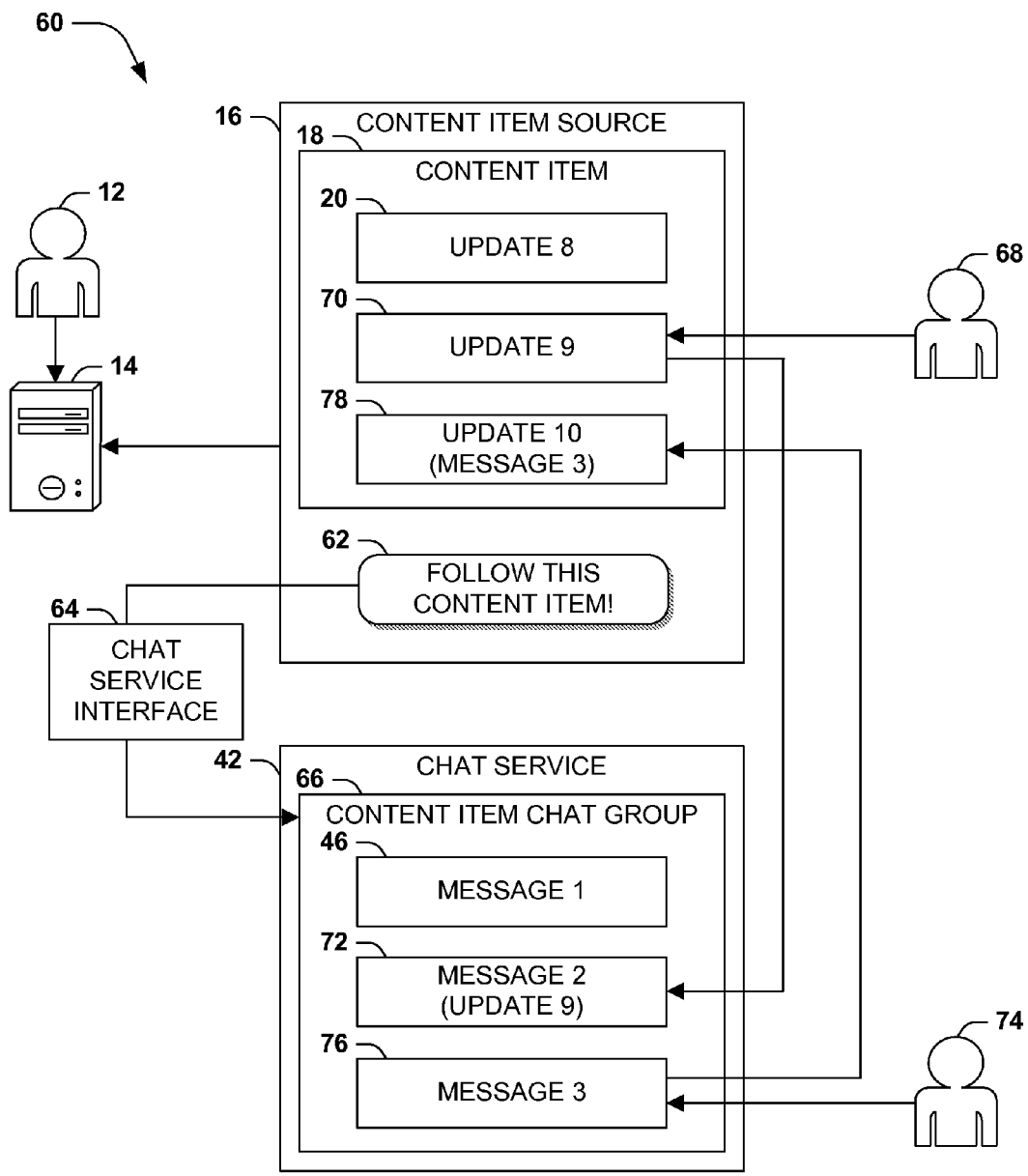
FIG. 3 is an illustration of an exemplary scenario featuring a cooperative interaction of a content item source and a chat service to notify a user of updates to a content item hosted by the content item source, and also to share content relating to the content item between the content item source and the chat service.

FIG. 3 presents an exemplary scenario 60 featuring some techniques that may achieve this cooperative sharing. A user 12 may visit a content item source 16, may discover a content item 18 of interest, and may wish to follow the set of updates 20 to the content item 18. Instead of permitting the user 12 to query or poll the content item source 16 for updates 20 to the content item 18, the content item source 16 may present to the user 12 an invitation 76 to join a chat group 64 regarding the content item 18 where updates 20 of the content item 18 may be posted in near-realtime. For example, the content item source 16 may present the invitation 76 as a control (such as a button) embedded in a web page or wiki page rendering that includes the content item 18, and the user 12 may activate the control to invoke a chat service interface 64 on the device 14 of the user 12 (e.g., a chat client application) that connects to the chat group 66 created for conversation regarding the content item 18. When an author 68 submits to the content item source 16 a new update 70 to the content item 18, the content item source 16 may submit the new update 70 to the chat service 42 for posting as a new message 72 in the chat group 66. In this manner, the user 12 may be notified in near-realtime of the new update 70, instead of having to discover the new update 70 by querying or polling the content item source 16; and the updates 20 to the content item 18 may be injected into the conversation of the chat group 66 instead of chat participants 74 having to discover and refer to or excerpt the new updates 20. Additionally, when a chat participant 74 submits a new message 76 that it may be helpful to include as an update 20 to the content item 18, the chat service 42 may automatically submit the new message 76 to the content item source 16 for posting as a new update 78 to the content item 18. In this manner, portions of insightful conversation may be automatically included as updates 20 to the content item 18 stored by the content item source 16, without a user 12 having to prepare and submit a transcript or excerpt of the conversation to the content item source 16. These and other advantages may be achieved according to the techniques discussed herein.

Figure 4:
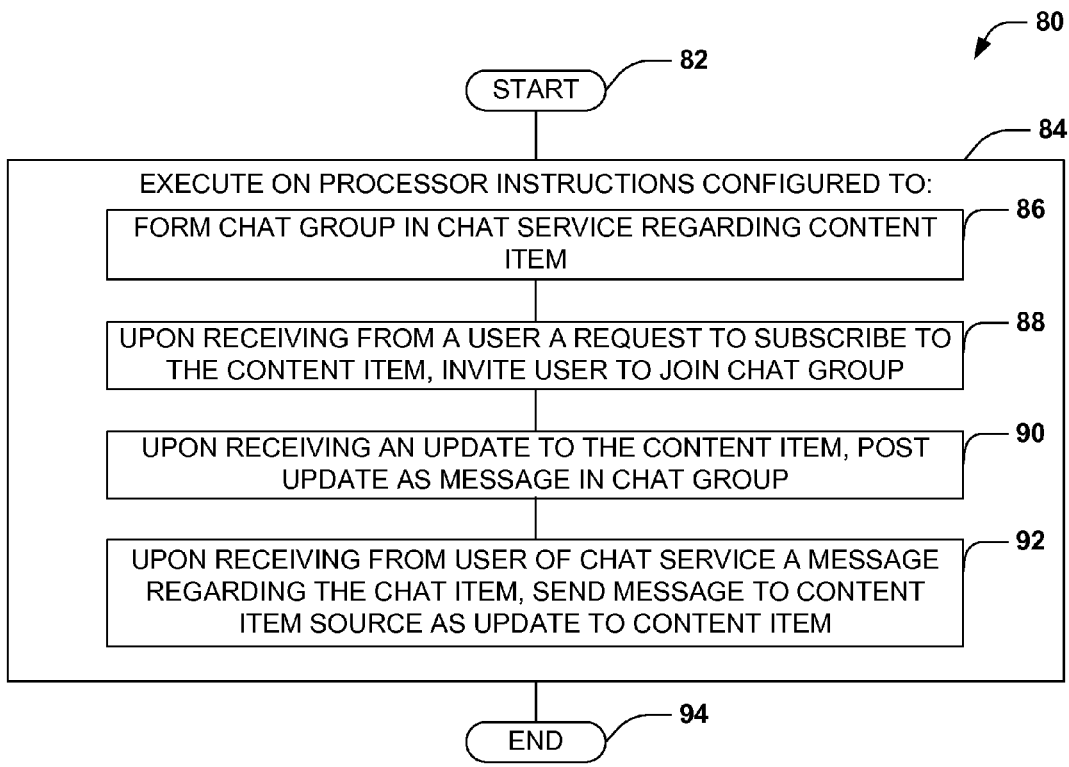
FIG. 4 is a flow chart illustrating an exemplary method of informing users of updates to a content item hosted by a content item source.

FIG. 4 presents a first embodiment of these techniques, illustrated as an exemplary method 80 of informing users 23 of updates 20 to a content item 18 hosted at a content item source 16, using a device having a processor and having access to a chat service 42. The exemplary method 80 may be implemented, e.g., as a volatile or nonvolatile memory comprising a set of instructions executable by a processor of the device and configured to achieve the techniques discussed herein. The exemplary method 80 begins at 82 and involves executing 84 the instructions on the processor. More specifically, the instructions are configured to form 86 a chat group 66 in the chat service 42 regarding the content item 18. The instructions are also configured to, upon receiving from a user 12 a request to subscribe to the content item 18, invite 88 the user 12 to join the chat group 66. The instructions are also configured to, upon receiving an update 20 to the content item 18, post 90 the update 20 as a message 46 in the chat group 44; and upon receiving from a user 12 of the chat group 44 a message 46 regarding the content item 18, send 92 the message 46 to the content item source 16 to be posted as an update 20 to the content item 18. In this manner, the exemplary method 80 achieves the informing of the users 12 of updates 20 to the content item 18, and so ends at 94.

Figure 5:
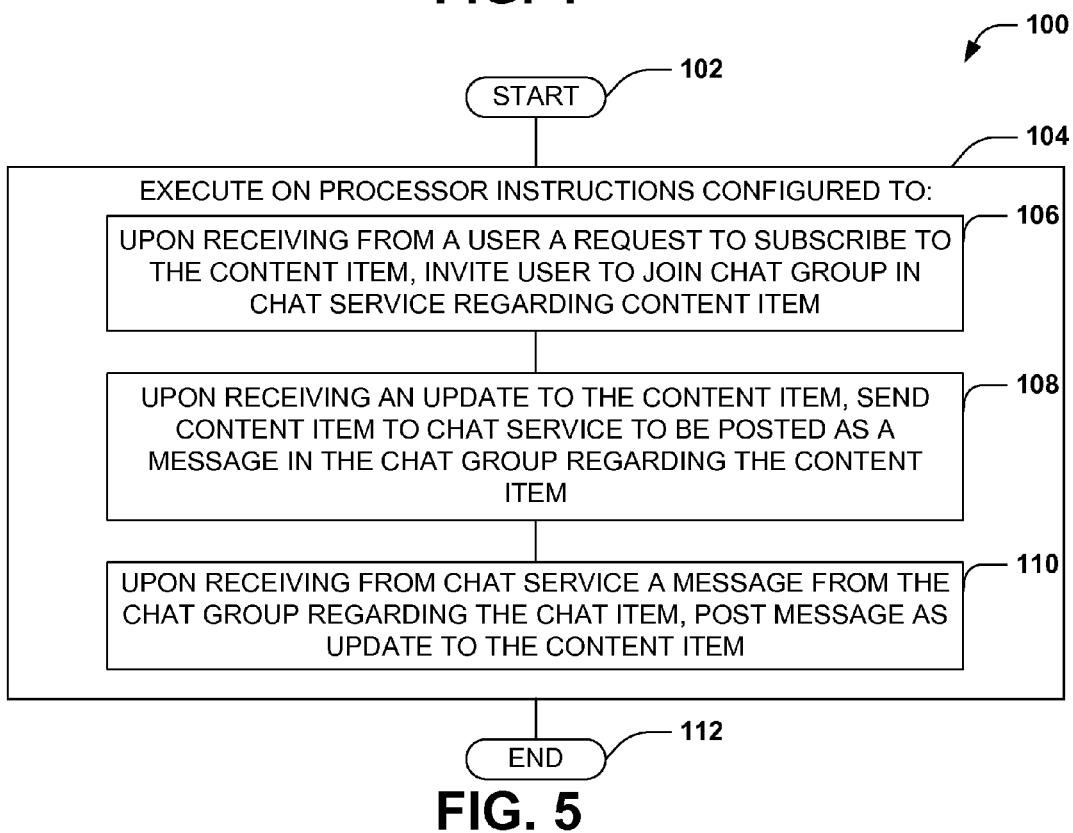
FIG. 5 is a flow chart illustrating an exemplary method of configuring a content item source to inform users of updates to a content item hosted by the content item source.

FIG. 5 presents a second embodiment of these techniques, illustrated as an exemplary method 100 of configuring a content item source 16 hosting a content item 18 to inform users 12 of updates 20 to the content item 18, using a device having a processor and having access to a chat service. The exemplary method 100 may be implemented, e.g., as a volatile or nonvolatile memory comprising a set of software instructions that are executable by a processor of the device and configured to achieve the techniques discussed herein. The exemplary method 100 begins at 102 and involves executing 104 the instructions on the processor. More specifically, the instructions are configured to, upon receiving from a user 12 a request to subscribe to the content item 18, invite 106 the user 12 to join a chat group 66 in the chat service 42 regarding the content item 18. The instructions are also configured to, upon receiving an update 20 to the content item 18, send 108 the content item 18 to the chat service 42 to be posted as a message 46 in the chat group 44 regarding the content item 18. The instructions are also configured to, upon receiving from the chat service 42 a message 46 from the chat group 44 regarding the content item 18, post 110 the message 46 as an update 20 to the content item 18. In this manner, the exemplary method 100 achieves the configuring of the content item source 16 to notify users 12 of new updates 20 to the content item 18, and so ends at 112.

Figure 6:
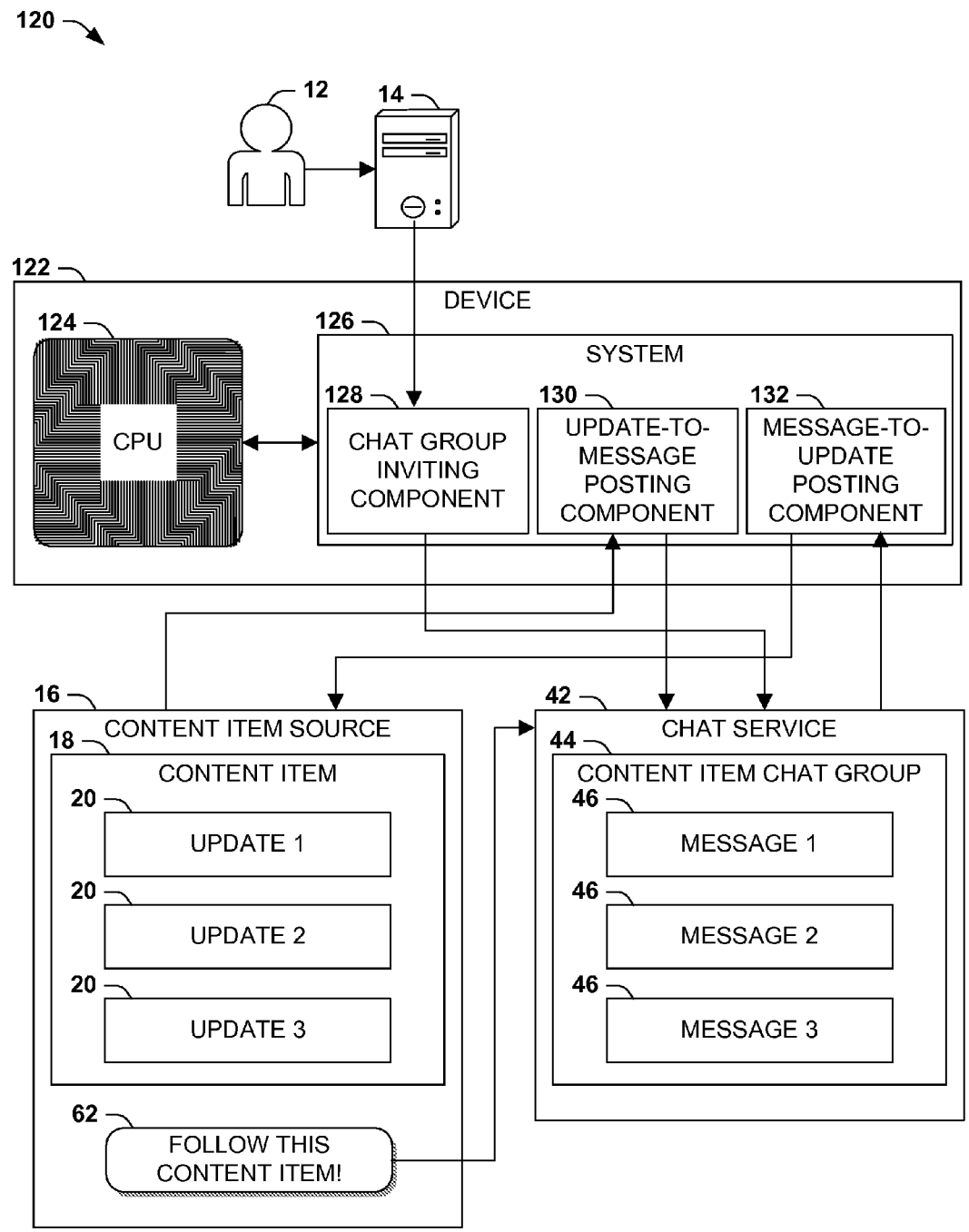
FIG. 6 is a component block diagram illustrating an exemplary system for informing users of updates to a content item hosted by a content item source.

FIG. 6 presents a third embodiment of these techniques, illustrated as an exemplary system 126 operating within a device 122 having a processor 124 and access to a chat service 42, which may configure the device 122 to inform users 12 of updates 20 a content item 18 hosted by a content item source 16. The exemplary system 126 may comprise, e.g., instructions executed by the processor 124 and configured to perform the techniques discussed herein. In particular, the exemplary system 126 comprises a chat group inviting component 128 configured to form a chat group 44 in the chat service 42 for discussion regarding the content item 18, and to, upon receiving from a user 12 a request to subscribe to the content item 18 (e.g., when the user 12 clicks a button 62 on a web page hosting the content item 18), invite the user 12 to join the chat group 44. The exemplary system 126 also comprises an update-to-message posting component 130 configured to, upon receiving an update 20 to the content item 18, post the update 18 as a message 46 in the chat group 44. The exemplary system 126 also comprises a message-to-update posting component 132 configured to, upon receiving from a user 12 of the chat group 44 a message 46 regarding the content item 18, send the message 46 to the content item source 16 to be posted as an update 20 to the content item 18. In this manner, the exemplary system 126 may cause the device 122 to facilitate the informing of users 12 of the posting of new updates 20 to the content item 18, and may also promote the automated and cooperative exchange of content regarding the content item 18 between the content item source 16 and the chat service 42.

Figure 7:
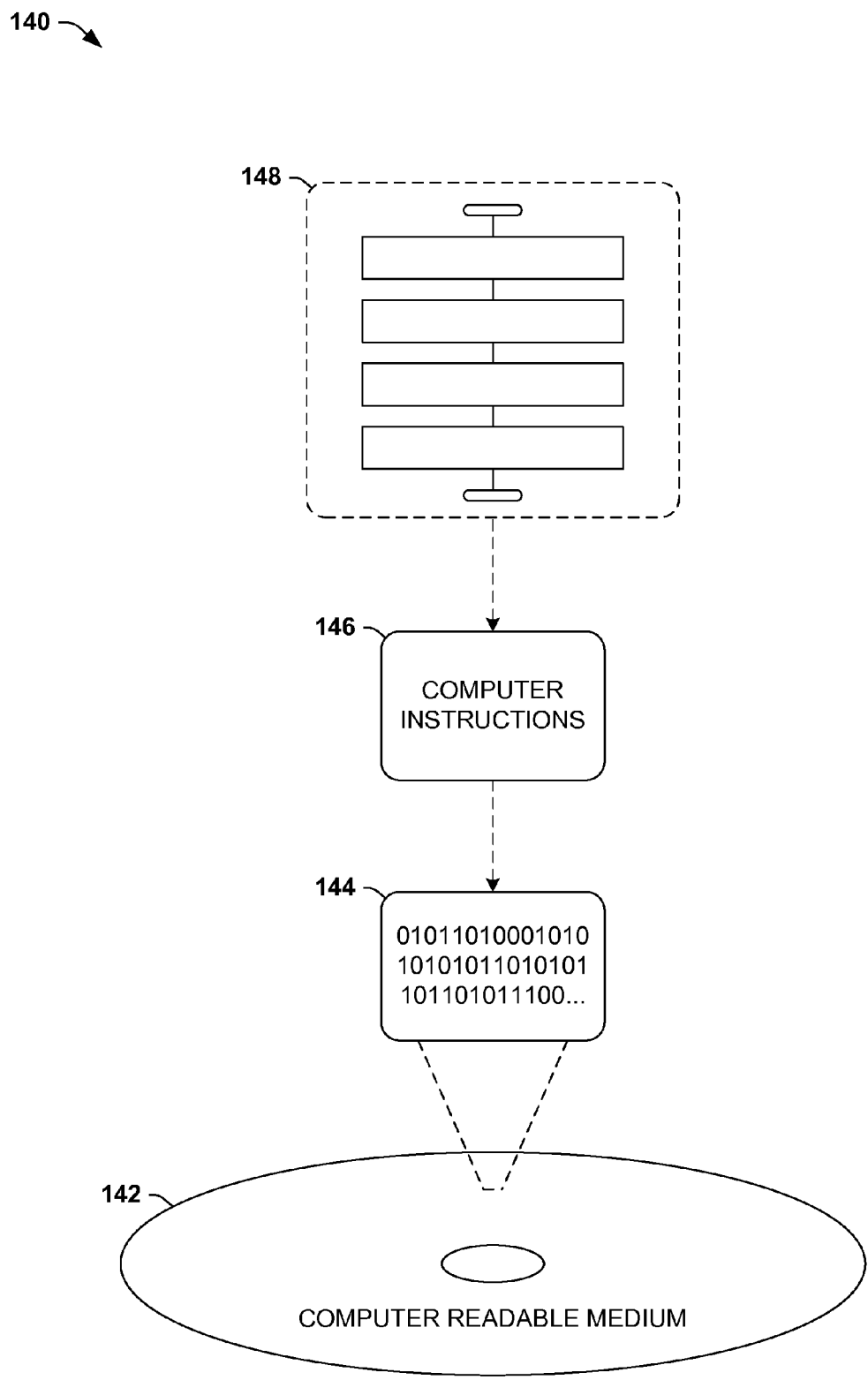
FIG. 7 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 7, wherein the implementation 140 comprises a computer-readable medium 142 (e.g., a CD-R, DVD-R, or a platter of a hard disk drive), on which is encoded computer-readable data 144. This computer-readable data 144 in turn comprises a set of computer instructions 146 configured to operate according to the principles set forth herein. In one such embodiment, the processor-executable instructions 146 may be configured to perform a method of informing users of updates to a content item hosted by a content item source, such as the exemplary method 80 of FIG. 4. In another such embodiment, the processor-executable instructions 146 may be configured to implement a system for informing users of updates to a content item hosted by a content item source, such as the exemplary method 100 of FIG. 5. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 80 of FIG. 4 and the exemplary method 100 of FIG. 5) to confer individual and/or synergistic advantages upon such embodiments.

A first aspect that may vary among embodiments of these techniques relates to the scenarios wherein these techniques may be utilized. As a first example, many types content item sources 16 may utilize these techniques in regard to hosting many types of content items, such as a news website hosting a set of news articles, a weblog hosting a set of weblog posts; a web forum hosting a set of web forum topics or threads; a media sharing site hosting a set of media objects, such as images, videos, or music; a social content feed hosting a set of content items; and an application site hosting a set of applications. As a second example of this first aspect, many types of chat services 42 may utilize these techniques to host many types of discussions, including a textual chat service such as an Internet Relay Chat (IRC) service; an instant messaging network hosting a group instant messaging chat; a voice chat service hosting a group voice-over-IP session; and a videoconferencing service hosting a group videoconferencing chat.

As a third example of this first aspect, a content item source 16 may utilize many chat services 42, and/or may send updates 20 to one or more content items 18 to several chat groups 44 within the same chat service 42 or multiple chat services 42. This may be useful, e.g., for permitting users 12 to choose to follow one or more content items 18 through a range of chat services 42 (possibly of different types, e.g., a voice chat service and a textual chat service), and/or many chat groups 44 hosted thereby (possibly of different scopes, e.g., a first chat group 44 offering a more verbose set of updates 20 comprising a comparatively detailed information set for a particular content item 18; a second chat group 44 offering a comparatively concise set of significant updates 20 for the same content item 18; and a third chat group 44 offering updates 20 for a range of content item 18 from a particular content item source 16.)

As a fourth example of this first aspect, a chat service 42 may be configured to receive updates 20 for content items 18 hosted by one content item source 16. Alternatively, a chat service 42 may receive updates 20 from several content item sources 16, and such content item sources 16 may offer similar types of content items 18 or a diverse set of content items 18 of many types. In one such embodiment, a chat group 44 hosted by a chat service 42 may be configured to receive a customized set of updates 18 for an entire set of content items 18 hosted by a large set of content item source 16 that may be of interest to a particular user 12 or group of such users 12.

As a fifth example of this first aspect, each user following the content item and/or participating in the group chat may utilize many types of devices, such as a workstation computer, a notebook or netbook computer, a palmtop device, such as a personal data assistant (PDA) or a smartphone; a game console; and an internet appliance or thin-client device. Such devices may also connect to the content item source 16 and/or the chat service 42 using many types of software, such as a specialized client configured for accessing a particular content item source 16 or chat service 42, a generalized client for accessing any content item source 16 or chat service 42 using a particular protocol (e.g., an Internet Relay Chat (IRC) client or a messaging protocol client, a web browser, or a thin client configured to present applications executing on a remote server. Those of ordinary skill in the art may devise many scenarios wherein the techniques presented herein may be utilized.

A second aspect that may vary among embodiments of these techniques relates to the architectures of solutions wherein these techniques are implemented. FIG. 6 presents one such architecture, but other architectures may be devised that implement these techniques, possibly with additional advantages as compared with other architectures. For example, it may be advantageous to combine some or all portions of the update-to-message posting component 130 and the message-to-update posting component 132, e.g., to unify particular processing aspects for more symmetric handling of such items, for shared configuration, or easier software development. As a second example of this second aspect, the components of the architecture may be distributed in many ways, particularly with regard to the content item source 16 and the chat service 42. As a first example, the content item source 16 may directly initiate the chat group 44, send users 12 to the chat service 42, may directly send updates 20 to content items 18 to the chat service 42, and may directly receive from the chat service 42 any messages 46 to be posted as updates 20 to the content item 18. Alternatively, the content item source 16 may rely on the chat service 42 or another service to handle some or all of these interactions. For example, the content item source 16 may receive objects or scripts (such as JavaScript or Python) offered by the chat service 42 or a third party to be injected into web pages featuring a content item 18, where such objects or scripts may perform some of the elements of these techniques. Similarly, the chat service 42 may directly form the chat group 44, receive users 12 and/or updates 20 to content items 18 from the content item source 16, and/or send messages 46 to the content item source 16 be posted as updates 20 to the content item 18, or may rely on the content item source 16 or a third party for some or all of these elements. For example, instead of sending updates 20 to the chat service 42 as a special type of object that is to be broadcast into one or more chat groups 44, an automated agent of the content item source 18 may directly join the chat group 44 as a participant, and may inject messages 46 into the chat group 44 corresponding to the updates 20 to the content item 18. Those of ordinary skill in the art may devise many architectures wherein the techniques discussed herein may be implemented.

A third aspect that may vary among embodiments of these techniques relates to the manner of inviting users 12 to join the chat group 44 for a particular content item 18. As a first example, the content item source 16 may simply notify the user 12 of the existence of the chat group 44, and may invite the user 12 to join the chat group 44 (and possibly to form the chat group 44 in the chat service 42 for discussing the content item 18.) As a second example, the content item source 16 may redirecting the user 12 to a chat service interface of the chat service 42, which may be configured to subscribe the user 12 to the chat group 44 for the content item 18. For example, a content item source 16 may include on a web page featuring a content item 18 a user control (e.g., the button 62 illustrated in FIG. 6) that redirects the web browser of the user 12 to a web page of the chat service 42 that subscribes the user 12 to the chat group 44 for the content item 18, and possibly connects the user 12 to the chat group 44 (e.g., by invoking a web-browser-based chat client that receives and renders messages 46 of the chat group 44.) As another example, when the user 12 requests to subscribe to the content item 18, the device 14 operated by the user 12 may invoke a client-side application, such as a chat client application, which may login to the chat service 42 to subscribe to the chat group 44 and/or to connect to the chat group 44. Those of ordinary skill in the art may devise many ways of inviting users 12 to join the chat groups 44 of many chat services 42 while implementing the techniques discussed herein.

A fourth aspect that may vary among embodiments of these techniques relates to the management of the state of the chat group 44. As a first example, when a user 12 requests to subscribe to a particular content item 18, a chat group 44 may already exist, and the content item source 16 may simply refer the user 12 to the chat group 44. Alternatively, the chat group 44 might not already exist; e.g., the chat group 44 might be created on an ad hoc basis when users 12 request to follow the content item 18, and the content item source 18 may receive a first such request from a first user 12 before the chat group 44 has been formed. For example, an embodiment of these techniques may be configured to, upon receiving a request from a user 12 to subscribe to a content item 18, query the chat service 42 to determine whether a chat group 44 regarding the content item 18 exists. If not, the embodiment may suggest to the user 12 to form the chat group 44 for the content item 18, or may form a chat group 44 in the chat service 42 regarding the content item 18 (e.g., by sending to the chat service 42 a request to create the chat group 44.) As an alternative embodiment, the chat service 42 may handle the automated creation of the chat groups 44, and may, upon receiving a first request from a first user 12 to join a chat group 44 for the particular content item 18, may create the chat group 44 on behalf of the content item 18.

As a second example of this fourth aspect, the content item source 16 and the chat service 42 may allow a chat group 44 for a particular content item 18 to continue to exist indefinitely, or until terminated by a user 12. This configuration may be useful, e.g., if a chat group 44 is designated to feature updates 20 and discussion for a set of content items 18 of a particular type and/or on a particular topic. Alternatively, the content item source 16 and/or the chat service 42 may actively participate in the termination of the chat groups 44 for particular content items 18. In one such embodiment, a chat group 44 for a particular content item 18 may be formed for a designated period of time, e.g., for 24 hours from the posting of the content item 18 on the content item source 16. In another such embodiment, the content item source 16 and/or the chat service 42 may actively monitor the interest of the users 12 in discussing the content item 16, and may, upon identifying reduced interest among the users 12 in the content item 16, terminate the chat group 44 in the chat service 42. For example, the chat service 42 may detect one or several factors as an indication of interest, including a minimum number of users 12 joined to the group chat 44 or actively participating in the group chat 44, a minimum number of messages 46 that may be received in the chat group 44 in a particular period, and/or a minimum number of updates 20 to the content item 18 by the content item source 16. Upon detecting such reduced interest, the content item source 16 and/or the chat service 42 may simply terminate the chat group 44, or may temporarily or indefinitely suspend the group chat 44 (e.g., until and unless new updates 20 to the content item 18 are received from the content item host 16.) The chat service 42 may also simply disconnect users 12 from the chat group 44 for the content item 18, and/or may redirect users 12 to a different chat group 44. Those of ordinary skill in the art may devise many ways of managing the state of a chat group 44 for particular content item 18 while implementing the techniques discussed herein.

A fifth aspect that may vary among embodiments of these techniques relates to the manner of detecting updates 20 to a content item 18 posted by the content item source 16 and sending such updates 20 as messages 46 to be posted within a chat group 44 of the chat service 42. As a first example, when the content item source 16 receives an update 20, it may deliver the content item 16 to the chat service 42, which may receive the content item 16 and post it as a message 46 in the chat group 44. For example, the chat service 42 may provide an application programming interface (API) or web service that the content item source 16 may invoke to transfer the content item 18.

As a second example of this fifth aspect, the content item source 16 may directly transmit updates 20 as messages 46 within the chat group 44. For example, the content item source 16 may join the chat group 44 for the content item 18 as an automated agent on par with regular users 12, and upon receiving at least one update 20 of the content item 18, may post one or more messages 46 to the chat group 44 corresponding to the update 20. As a third variation, the content item source 16 may send updates 20 to the chat service 42 through various users 12, such as by redirecting a user 12 who submits an update 20 to the content item source 16 to deliver the update 20 as a message 46 within the chat group 44 hosted by the chat service 42. For example, a content item source 16 comprising a weblog may include a "Submit" button tied to a textbox on a comments web page. The "Submit" button might be tied to a script (such as JavaScript) that not only instructs the web browser to send the contents of the textbox to the weblog for posting as a comment (i.e., as an update 20 to the content item 18), but might also redirect the web browser of the user 12 to send the message 20 to the chat host 46, e.g., as a request to a web service that accepts the comment and injects it into the chat group 44 as one or more messages 46. This variation may be helpful, e.g., for utilizing the computing resources and bandwidth of the users 12 to send the update 20 to the chat service 42 instead of the resources of the content item source 16.

As a third example of this fifth aspect, an external process may detect updates 20 to the content item 18 at the content item source 16. For example, the chat service 42 may periodically poll the content item source 16 to detect updates 20 to the content item 18, and upon detecting at least one update 20, may request the update 20 to the content item 18 for posting as a message 46 within the chat group 44 of the chat service 42. Alternatively, a third-party service may perform this polling, and may deliver updates 20 to the chat service 42. Such polling may be performed, e.g., by identifying changes within a web page hosting the content item 18, by monitoring metadata (such as a version number or date of updating) for the content item 18 or the containing web page, by monitoring a data feed (such as a Real Simple Syndication (RSS) feed) offered by the content item source 16 and indicating the receipt of recent updates, etc. This example may be helpful, e.g., where the content item source 16 cannot actively participate in the redelivery of updates 20 to the chat service 42, or where the content item source 16 declines to participate in the cooperative arrangement with the chat service 42. Those of ordinary skill in the art may devise many ways of identifying or detecting updates 20 to the content item 18 at the content item source 16 while implementing the techniques discussed herein.

A sixth aspect that may vary among embodiments of these techniques relates to the manner of posting an update 20 to a content item 18 as a message 46 in the chat group 44. As a first example, the update 20 may be posted in the chat group 44 as a message 46 from the content item source 16, or as a message 46 from a user 12 who may have submitted the update 20 to the content item source 16 (e.g., as a message 46 from the author of a comment posted on a weblog.) As a second example of this sixth aspect, the update 20 may be posted as a message 46 in full detail (e.g., a complete rebroadcast of a comment to a weblog), as an excerpt or summary of the update 20 (e.g., the first few words or sentences of a comparatively lengthy update 20 may be posted as a message 46), as a link to the full version of the update 20 at the content item source 16, or as simply a notification that an update 20 has been received at the content item source 16.

A third example of this sixth aspect relates to the often different communication environments of a content item source 16, where a comparatively large or long update 20 may be hosted, and a chat group 44, which is often unsuitable for large or long messages 46 (e.g., where the communications protocol does not support comparatively long messages 46, which may be difficult for users 12 of the chat group 44 to read in a chat client, and/or which may be simply considered against the etiquette of the chat group 44.) When comparatively large or long update 20 is received, it may be segmented into one or more update segments, each of which may be posted as a message 46 in the chat group 44. The segmenting may be performed, e.g., by dividing a message 46 at arbitrary positions (e.g., at one hundred characters or after three sentences), or with more sophisticated techniques (e.g., semantically identifying segments comprising discrete entities, such as literary groupings or arguments in an essay.) In this manner, an automated conversion may be performed between the communications etiquette of the content item source 16 and that of the chat group 44.

Figure 8:
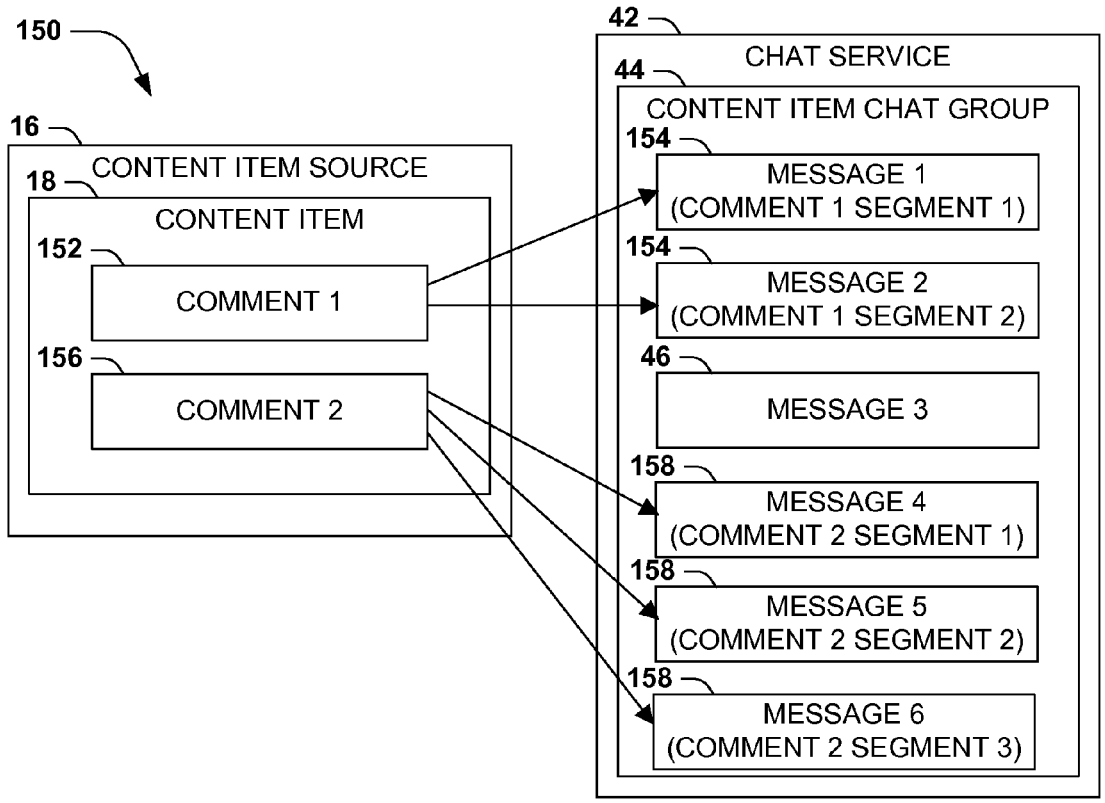
FIG. 8 is an illustration of an exemplary scenario featuring a segmenting of an update to a content item posted by a content item source into several messages posted within a chat group.

FIG. 8 illustrates an exemplary scenario 150 featuring the segmenting of comments to a content item 18 hosted by a content item source 16, e.g., comments posted to an article in a weblog. Respective comments may be evaluated for length, and may be segmented by any suitable technique into a set of update segments for posting as messages 46 in the chat group 44 of the chat service 42. For example, a first comment 152 may be segmented into a first update segment 154 and a second update segment 154, which may be posted sequentially as messages in the chat group 44. Similarly, a second comment 156 may be segmented into three update segments 158, which may be posted as three sequential messages 46 in the chat group 46.

A fourth example of this sixth aspect relates to the manner of reducing the redundancy and inefficiency of updating the chat group 44 with messages 46 that have already been posted to the chat group 44. As one example, an update 20 to the content item 18 at the content item source 16 may relate information that has previously been posted as a message 46 in the chat group 44, and it may be advantageous to detect such redundancy and avoid the posting of such updates 20 as messages 46 in the chat group 44. As another example, a message 46 posted in the chat group 44 might be posted as an update 20 to the content item 18 at the content item source 16, and a less efficient embodiment of these techniques might also identify the update 20 to the content item 18 as having been recently received by the content item source 16, and might repost it as a message 46 in the chat group 44, thereby creating redundancy and inefficiently utilizing the resources of the chat group 44 and/or the content item source 16. Therefore, an embodiment of these techniques may be configured to, before posting an update 20 as a message 46 in the chat group 44, determine whether the update 20 was received (and has already been posted) as a message 46 in the chat group 44, and may post the update 20 as a message 46 in the chat group 44 upon verifying that the message 46 has not previously been posted. For example, the chat service 42 may examine recent logs of messages 46 posted in the chat group 44 in order to compare the current message 46 (corresponding to an update 20 to the content item 18) has already been posted. In a similar manner, the content item source 16 may, before sending an update 20 to the chat group 44 for posting, verify that the update 20 did not originate as a message 46 received in the chat group 44. Those of ordinary skill in the art may devise many ways of detecting and updates 20 of content items 18 hosted by a content item source 16, and of sending such updates 20 to a chat service 42, while implementing the techniques discussed herein.

A seventh aspect that may vary among embodiments of these techniques relates to the manner of sending messages 46 in a chat group 44 to a content item source 16 to be posted as updates 20 to the content item 18 discussed in the chat group 44. As a first example, messages 46 may be transmitted from the chat group 44 to the content item source 16 in many ways. In one such embodiment, the chat service 42 may endeavor to identify messages 46 received in the chat room 44 that are relevant to the content item 18 or an update 20 thereto, and may transmit such messages 46 to the content item source 16. In one such embodiment, the content item source 16 may specify an updating interface configured to receive updates 20 to the content item 18, such as a Uniform Resource Identifier (URI) comprising a callback or web service, which the chat service 42 may invoke to send one or more messages 46 the content item source 46 as updates 20 to a content item 18. Indeed, in some such scenarios, this embodiment may detect the URI from an aspect of the content item source 16 that is not specifically configured to coordinate with the chat service 42, e.g., a weblog site that couples a comment submission postback URI to a "Submit" button in a comments section of a web page. Conversely, the content item source 16 may identify and retrieve messages 46 from the chat service 42; e.g., the content item source 16 may automatically monitor the messages 46 exchanged in a chat group 44, and may automatically select and copy messages 46 (to be posted as updates 20 to a content item 18) that are deemed to be relevant to the content item 18 and/or an update 20 thereto. This configuration may be helpful, e.g., to promote discussion of a content item 18 on a chat service 42 that is not specifically configured to coordinate with the content item source 16.

As a second example of this seventh aspect, the chat service 42 may send all messages 46 received in the chat group 44 to the content item source 16 for posting as updates 20 to the content item 18. Alternatively, only some of the messages 20 may be sent. For example, in many chat group environments, the conversation may diverge from a particular topic (such as the content item 18), possibly for extended portions of dialogue, before returning to the content item 18 or an update 20 thereto. Therefore, the chat service 42 and/or the content item source 16 may endeavor to identify messages 46 that are related to a content item 18 or update 20. Such identification may use comparatively simple techniques (e.g., messages 46 including a keyword associated with the content item 18, or that are within a certain period of time or number of messages 46 since the posting of the content item 18 or an update 20 thereto in the chat group 44) and/or comparatively sophisticated techniques (e.g., semantic and contextual parsing of messages 46 to identify those that pertain to the content item 18 and/or an update 20.) This analysis might also be performed, e.g., by the chat service 42 (which may send to the content item source 16 only the messages 46 that are relevant to the content item 18 and/or an update 20) and/or by the content item source 16 (which may receive many messages 46 from the chat service 42, but may filter these messages 46 for relevance to the content item 18 and/or an update 20.) In still another variation, a user 12 may expressly identify one or more messages 46 as relevant to the content item 18 or an update 20, e.g., by including a keyword in the message 46 or by directing the message 46 to a particular user 12 of the chat service 42 (e.g., an automated agent of the content item source 16 that is present within the chat group 44 in order to exchange messages 46 relating to the content item 18 and updates thereto 20.)

As a third example of this seventh aspect, messages 46 may be translated into updates 20 to the content item 18 in many ways. In a simple variation, each message 46 may be posted as an update 20 of the content item 18, but this may lead to a large number of updates 20 to the content item 18. In other variations, two or more messages 46 may together be regarded as comprising an update 20 to the content item 18, and may be sent together to the content item source 16 as an update 20 to the content item 18. For example, a set of messages 46 by a particular user 12 of the chat group 44 (particularly a sequence of such messages 46 by the same user 12), or among two or more users 12 comprising a dialogue, may be excerpted and posted together as an update 20. These and other variations may be combined with the automated identification of messages 46 that may be relevant to the content item 18 or an update 20 thereto; e.g., a set of messages 46 that are automatically identified as together having a high probability of relating to the content item 18 or an update 20 thereto (such as based on the frequency of relevant keywords appearing in the set of messages 46) may be considered and submitted to the content item source 16 as an update 20 to the content item 18.

Figure 9:
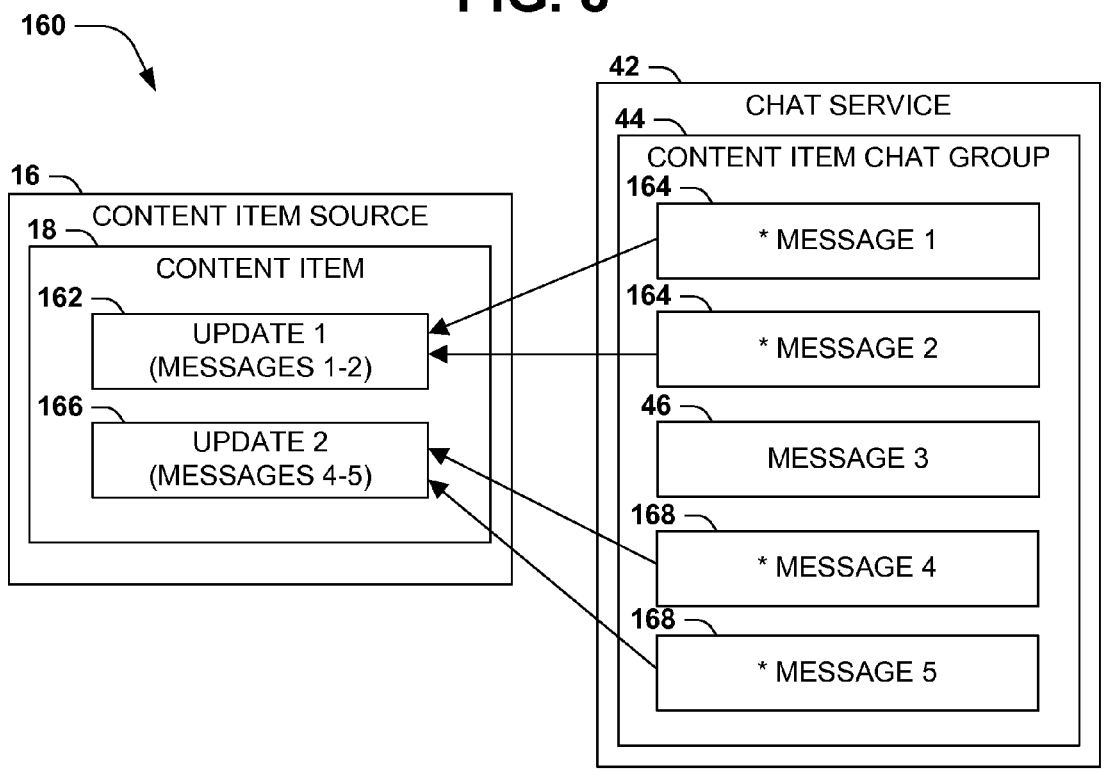
FIG. 9 is an illustration of an exemplary scenario featuring a combining of a plurality of messages posted within a chat group as an update to a content item hosted by a content item source.

FIG. 9 presents an exemplary scenario 160 featuring a combining of messages 46 posted in a chat group 44 of a chat service 42 in order to create updates 20 to a content item 18 hosted by a content item source 16. In this exemplary scenario 160, the chat group 44 contains a sequence of messages 46, some of which may be identified (e.g., by an express indication by the user authoring each message 46, by keyword analysis, or by semantic parsing) as relating to a content item 18 or an update 20 thereto. A first message set 164 comprising messages 46 relating to the content item 18, comprising the first and second messages 46 of the chat group 44, may be combined and posted together by the content item source 16 as a first update 162 to the content item 18. Similarly, a second message set 168 relating to the content item 18, comprising the third, fourth, and fifth messages 46 of the chat group 44, may be combined and posted together by the content item source 16 as a second update 166 to the content item 18. As another simple variation, a complete or abridged transcript, or a synopsis thereof, of all messages 46 received in the chat group 44 within a particular time period, may be identified together as an update 20. In this manner, the content item source 16 may identify contextually related sets of messages 46 in the chat group 44, and may consolidate and post such sets of messages 46 into updates 20 to the content item 18.

As a fourth aspect of this seventh example, redundancy and inefficiency may be reduced in the posting of updates 20 to the content item 18 by verifying that the messages 46 posted in the chat group 44 for the content item 18 have not already been posted as updates 20 to the content item 18. As one example, a message 46 posted in the chat group 44 may relate information that has already been posted as an update 20 to the content item 18 at the content item source 16, and it may be advantageous to detect such redundancy and avoid the posting of such messages 46 as updates 20 to the content item 18. As another example, a message 46 received from the chat service 42 might have originated as an update 20 to the content item 18 at the content item source 16. A less efficient embodiment of these techniques might nevertheless repost this message 46 as an update 20 to the content item 18, thereby creating redundancy and inefficiently utilizing the resources of the content item source 16. Therefore, a more sophisticated embodiment of these techniques may be configured to, before posting a message 46 as an update 20 to the content item 18 at the content item source 16, determine whether the update 20 was already posted, and may post the update 20 as to the content item 18 only after verifying that the update 20 has not previously been posted. Those of ordinary skill in the art may devise many ways of receiving messages 46 and posting such messages 46 as updates 20 to the content item 18 at the content item source 14 while implementing the techniques discussed herein.

An eighth aspect that may vary among embodiments of these techniques relates to additional features that may be included with various embodiments. As a first example, an update 20 may be detected as having a responsive relationship 24 with a previous update 20 (e.g., a comment to an article in a weblog may have been posted with a responsive relationship 24 with a previously posted comment.) This responsive relationship 24 may be indicated in corresponding messages 46 injected into the chat group 44; e.g., when a second update 20 has a responsive relationship 24 with a first update 20, the responsive relationship 24 of the second update 20 with the first update 20 may be indicated to the chat service 42 and/or within the message 46 so posted. For example, a textual indication of the responsive relationship 24 may be included in a message 46 (e.g., "In response to update number three . . . .") Conversely, a message 46 posted in the chat group 44 may have a responsive relationship 24 with an earlier message 46 posted in the chat group 44, and this responsive relationship 24 may be indicated in the corresponding update 20 to the content item 18 posted at the content item source 16.

As a second example of this eighth aspect, the content item source 16 may be configured to receive and display messages 46 relating to a content item 18 in a comparatively transient manner, e.g., a temporary rebroadcasting of messages 46 about the content item 18. Conversely, the content item source 16 may comprise a content item store that is configured to store at least one message 46 posted as an update 20 of the content item 18. This storing may be temporary or non-temporary, and may permit users 12 to search or filter updates 20 (including updates 20 that were originally posted as messages 46 in the chat group 44) in various ways. Those of ordinary skill in the art may devise many additional features that may be added to various embodiments of the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
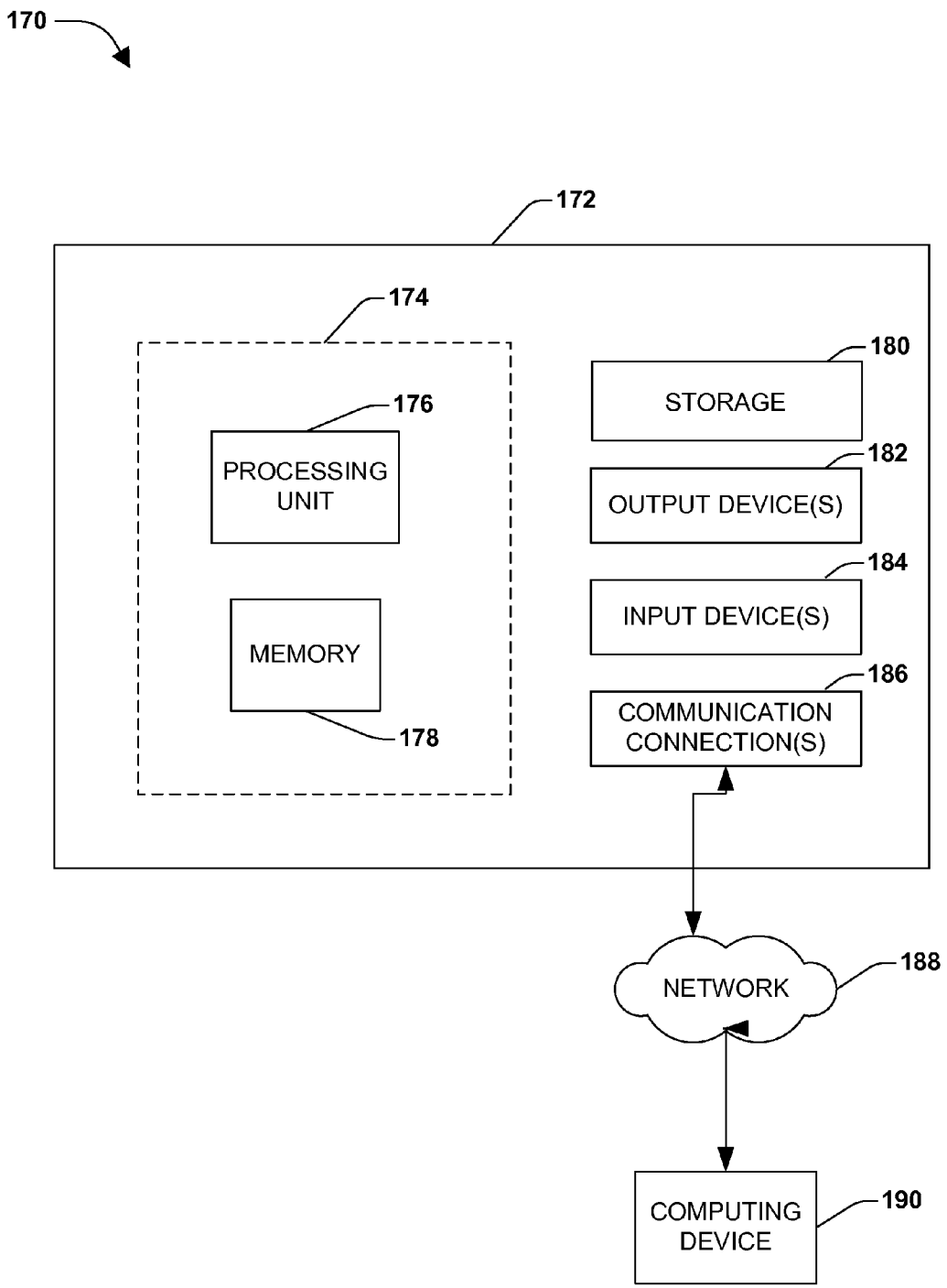
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 170 comprising a computing device 172 configured to implement one or more embodiments provided herein. In one configuration, computing device 172 includes at least one processing unit 176 and memory 178. Depending on the exact configuration and type of computing device, memory 178 may be volatile (such as RAM, for example), non-volatile (such as ROM, flash memory, etc., for example) or some combination of the two. This configuration is illustrated in FIG. 10 by dashed line 174.

In other embodiments, device 172 may include additional features and/or functionality. For example, device 172 may also include additional storage (e.g., removable and/or non-removable) including, but not limited to, magnetic storage, optical storage, and the like. Such additional storage is illustrated in FIG. 10 by storage 180. In one embodiment, computer readable instructions to implement one or more embodiments provided herein may be in storage 180. Storage 180 may also store other computer readable instructions to implement an operating system, an application program, and the like. Computer readable instructions may be loaded in memory 178 for execution by processing unit 176, for example.

The term "computer readable media" as used herein includes computer storage media. Computer storage media includes volatile and nonvolatile, removable and non-removable media implemented in any method or technology for storage of information such as computer readable instructions or other data. Memory 178 and storage 180 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 172. Any such computer storage media may be part of device 172.

Device 172 may also include communication connection(s) 186 that allows device 172 to communicate with other devices. Communication connection(s) 186 may include, but is not limited to, a modem, a Network Interface Card (NIC), an integrated network interface, a radio frequency transmitter/receiver, an infrared port, a USB connection, or other interfaces for connecting computing device 172 to other computing devices. Communication connection(s) 186 may include a wired connection or a wireless connection. Communication connection(s) 186 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 172 may include input device(s) 184 such as keyboard, mouse, pen, voice input device, touch input device, infrared cameras, video input devices, and/or any other input device. Output device(s) 182 such as one or more displays, speakers, printers, and/or any other output device may also be included in device 172. Input device(s) 184 and output device(s) 182 may be connected to device 172 via a wired connection, wireless connection, or any combination thereof. In one embodiment, an input device or an output device from another computing device may be used as input device(s) 184 or output device(s) 182 for computing device 172.

Components of computing device 172 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 172 may be interconnected by a network. For example, memory 178 may be comprised of multiple physical memory units located in different physical locations interconnected by a network.

Those skilled in the art will realize that storage devices utilized to store computer readable instructions may be distributed across a network. For example, a computing device 190 accessible via network 188 may store computer readable instructions to implement one or more embodiments provided herein. Computing device 172 may access computing device 190 and download a part or all of the computer readable instructions for execution. Alternatively, computing device 172 may download pieces of the computer readable instructions, as needed, or some instructions may be executed at computing device 172 and some at computing device 190.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of informing users of updates to a content item hosted at a content item source, the method using a device having a processor and access to a chat service and comprising:
    executing on the processor instructions configured to:
        form a chat group in the chat service regarding the content item, the chat group enabling at least two members to exchange messages that are distinct from updates to the content item at the content item source;
        upon receiving from a user a request to subscribe to the content item, invite the user to join the chat group;
        upon receiving an update to the content item, while the chat group comprises at least two members, post the update as a message to the at least two members within the chat group; and upon detecting a message posted by a member within the chat group:
determine wee whether the message regards the content item; and
upon determining that the message regards the content item, send the message to the content item source to be posted as an update to the content item.

2. The method of claim 1, inviting a user to join the chat group comprising: redirecting the user to a chat service interface of the chat service configured to subscribe the user to the chat group.

3. The method of claim 1, forming the chat group comprising:
upon receiving a request from a user to subscribe to the content item:
querying the chat service to determine whether a chat group regarding the content item exists; and
upon determining that a chat group regarding the content item does not exist, forming a chat group in the chat service regarding the content item.

4. The method of claim 1, the instructions configured to, upon identifying reduced interest among the members of the chat group in the content item, terminate the chat group in the chat service.

5. The method of claim 1, receiving an update to the content item comprising: receiving an update to the content item pushed by the content item source.

6. The method of claim 1, receiving an update to the content item comprising:
periodically polling the content item source to detect at least one update to the content item, and
upon detecting at least one update to the content item, requesting the at least one update to the content item from the content item source.

7. The method of claim 1, posting an update to the content item as a message in the chat group comprising:
segmenting the update into at least two update segments, and
for respective update segments, posting the update segment as a message to the at least two members within the chat group.

8. The method of claim 1, posting an update to the content item as a message by a member of the chat group comprising:
determining whether the update was received as a message from a member within the chat group, and
upon determining that the update was not received as a message from a member within the chat group, posting the update as a message to the at least two members within the chat group.

9. The method of claim 1:
the content item source specifying an updating interface configured to receive updates to the content item; and
sending a message to the at least two members within the chat group to the content item source to be posted as an update to the content item comprising: sending the message to the content item source by invoking the updating interface with the message.

10. The method of claim 1, receiving a message from the member of the chat group a message regarding the content item comprising: receiving from the member of the chat group a message specified by the member as regarding the content item.

11. The method of claim 1, sending a message to the at least two members within the chat group to the content item source to be posted as an update to the content item comprising:
identifying at least two messages comprising an update to the content item, and
sending the at least two messages to the content item source to be posted as an update to the content item.

12. The method of claim 1, sending a message to the at least two members within the chat group to the content item source to be posted as an update to the content item comprising:
determining whether the message was received from the content item source to be posted as an update to the content item, and
upon determining that the message was not received from the content item source as an update to the content item, sending the message to the content item source to be posted as an update to the content item.

13. The method of claim 1, a second update of the content item having a responsive relationship with a first update of the content item.

14. The method of claim 13:
the second update of the content item received as a message from a member within the chat group; and
sending the message to the content item source to be posted as an update to the content item comprising: indicating to the content item source the responsive relationship of the message with the first update of the content item.

15. The method of claim 13:
the second update of the content item received from the content item source as an update to the content item; and
posting the second update as a message to the at least two members within the chat group comprising: posting the second update as a message to the at least two members within the chat group, the message indicating the responsive relationship of the update with the second update.

16. The method of claim 1, the instructions configured to store in a content item store at least one update of the content item posted as a message by a member within the chat group.

17. A method of configuring a content item source hosting a content item to inform users of updates to the content item, the method using a device having a processor and having access to a chat service and comprising:
executing on the processor instructions configured to:
upon receiving from a user a request to subscribe to the content item, invite the user to join a chat group in the chat service regarding the content item, the chat group enabling at least two members to exchange messages that are distinct from updates to the content item at the content item source;
upon receiving an update to the content item while the chat group comprises at least two members, send the content item to the chat service to be posted as a message to the at least two members within the chat group regarding the content item; and
upon detecting a message posted by a member within the chat group:
determine whether the message regards the content item; and
upon determining that the message regards the content item, post the message as an update to the content item.

18. The method of claim 17, sending the update to the content item comprising:
joining the chat group of the chat service for the content item, and
upon receiving an update to the content item, posting the update as a message to the at least two members within the chat group.

19. The method of claim 17, sending the update to the content item to the chat service comprising: upon receiving an update to the content item from a member of the chat group, redirecting the member to send the update to the chat service.

20. A computer-readable memory device storing instructions that, when executed by a processor of a device having access to a chat service, inform uses of updates to a content item hosted at a content item source by:
  upon receiving from a user a request to subscribe to the content item, inviting the user to join a chat group in the chat service regarding the content item, the chat group enabling at least two members to exchange messages that are distinct from updates to the content item at the content item source;
  upon receiving an update to the content item while the chat group comprises at least two members, sending the content item to the chat service to be posted as a message to the at least two members within the chat group regarding the content item; and
  upon detecting a message posted by a first member to a second member within the chat group:
    determining whether the message regards the content item; and
    upon determining that the message regards the content item, sending the message to the content item source to be posted as an update to the content item.

* * * * *